United States Patent
Oh

(10) Patent No.: US 9,485,396 B2
(45) Date of Patent: Nov. 1, 2016

(54) CAMERA MODULE FOR OPTICAL IMAGE STABILIZATION

(71) Applicant: LG INNOTEK CO., LTD., Seoul (KR)

(72) Inventor: Sang Yun Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/442,950

(22) PCT Filed: Mar. 29, 2013

(86) PCT No.: PCT/KR2013/002659
§ 371 (c)(1),
(2) Date: May 14, 2015

(87) PCT Pub. No.: WO2014/092250
PCT Pub. Date: Jun. 19, 2014

(65) Prior Publication Data
US 2015/0296106 A1 Oct. 15, 2015

(30) Foreign Application Priority Data
Dec. 14, 2012 (KR) .................. 10-2012-0145920

(51) Int. Cl.
*H04N 5/225* (2006.01)
*G03B 5/00* (2006.01)
(Continued)

(52) U.S. Cl.
CPC .............. *H04N 5/2252* (2013.01); *G02B 7/08* (2013.01); *G02B 27/646* (2013.01); *G03B 5/00* (2013.01);
(Continued)

(58) Field of Classification Search
CPC ............. H04N 5/2252; H04N 5/2254; H04N 5/2257; H04N 5/23287; H04N 5/2253; H04N 5/23248; G02B 27/646; G02B 7/08; G03B 13/36; G03B 5/00; G03B 5/02; G03B 2205/0015; G03B 2205/0069; G03B 17/02
USPC ......................................... 348/340
See application file for complete search history.

(56) References Cited

U.S. PATENT DOCUMENTS 7,881,598 B1 * 2/2011 Wu .................... G03B 3/10
396/133
8,681,227 B2 * 3/2014 Ryu .................. H04N 5/2252
348/208.2

(Continued)

FOREIGN PATENT DOCUMENTS

JP 2012-237855 A 12/2012
JP 2012-238029 A 12/2012
(Continued)

OTHER PUBLICATIONS

International Search Report in International Application No. PCT/KR2013/002659, filed Mar. 29, 2015.
(Continued)

*Primary Examiner* — Pritham Prabhakher
(74) *Attorney, Agent, or Firm* — Saliwanchik, Lloyd & Eisenschenk

(57) ABSTRACT

An exemplary embodiment of the present disclosure includes a PCB (Printed Circuit Board) mounted with an image sensor, a housing disposed at coupled to an upper surface of the PCB, a holder module spaced from a bottom surface of the housing at a predetermined distance, wound with a first coil at a periphery and including thereinside at least one or more lenses, a connecting portion disposed at coupled to an upper surface of the holder module and including a conductive pattern, a plate member coupled to a bottom surface of the holder module, and a plurality of wire springs connected at one end to the connecting portion and connected at the other distal end to the plate member.

12 Claims, 4 Drawing Sheets

(51) Int. Cl.
*G02B 27/64* (2006.01)
*H04N 5/232* (2006.01)
*G02B 7/08* (2006.01)
*G03B 13/36* (2006.01)

(52) U.S. Cl.
CPC ............ *G03B 13/36* (2013.01); *H04N 5/2253* (2013.01); *H04N 5/2254* (2013.01); *H04N 5/2257* (2013.01); *H04N 5/23287* (2013.01); *G03B 2205/0015* (2013.01); *G03B 2205/0069* (2013.01); *H04N 5/23212* (2013.01)

(56) References Cited

U.S. PATENT DOCUMENTS

| | | | | |
|---|---|---|---|---|
| 2009/0002825 A1* | 1/2009 | Morita | ............ | G03B 5/00 359/554 |
| 2009/0052037 A1* | 2/2009 | Wernersson | ......... | G02B 27/646 359/554 |
| 2009/0252488 A1* | 10/2009 | Eromaki | ............ | G02B 7/102 396/529 |
| 2010/0002301 A1* | 1/2010 | Lee | ............ | G02B 27/646 359/557 |
| 2010/0053412 A1* | 3/2010 | Sekimoto | ............ | G03B 9/08 348/335 |
| 2010/0110270 A1* | 5/2010 | Sekimoto | ............ | H04N 5/2254 348/340 |
| 2010/0149354 A1* | 6/2010 | Makimoto | ............ | G02B 27/646 348/208.99 |
| 2010/0265343 A1* | 10/2010 | Lee | ............ | G02B 27/646 348/208.7 |
| 2010/0315520 A1* | 12/2010 | Noto | ............ | G03B 5/00 348/208.11 |
| 2011/0096178 A1* | 4/2011 | Ryu | ............ | H04N 5/2252 348/208.2 |
| 2011/0097062 A1* | 4/2011 | Tsuruta | ............ | G02B 7/022 396/55 |
| 2011/0217029 A1* | 9/2011 | Wu | ............ | G03B 17/00 396/55 |
| 2011/0285890 A1* | 11/2011 | Choi | ............ | H04N 5/2251 348/308 |
| 2012/0106936 A1* | 5/2012 | Lim | ............ | G03B 5/02 396/55 |
| 2012/0154614 A1* | 6/2012 | Moriya | ............ | G03B 3/10 348/208.5 |
| 2013/0016428 A1* | 1/2013 | Sugawara | ............ | G02B 7/08 359/557 |
| 2013/0050828 A1* | 2/2013 | Sato | ............ | G02B 27/64 359/557 |

FOREIGN PATENT DOCUMENTS

| | | |
|---|---|---|
| KR | 10-0952620 B1 | 4/2010 |
| KR | 10-1185730 B1 | 9/2012 |
| KR | 10-1204587 B1 | 11/2012 |
| TW | 200423305 A | 11/2004 |
| TW | 201123368 A | 7/2011 |

OTHER PUBLICATIONS

Taiwanese Office Action Dated Sep. 7, 2016 in Taiwanese Application No. 102113527.

* cited by examiner

CAMERA MODULE FOR OPTICAL IMAGE STABILIZATION

CROSS-REFERENCE TO RELATED APPLICATIONS

This application is the U.S. national stage application of International Patent Application No. PCT/KR2013/002659, filed Mar. 29, 2013, which claims priority to Korean Application No. 10-2012-0145920, filed Dec. 14, 2012, the disclosures of each of which are incorporated herein by reference in their entirety.

TECHNICAL FIELD

The teachings in accordance with exemplary and non-limiting embodiments of the present disclosure relate generally to a camera module.

BACKGROUND ART

Generally, a miniaturized, low power-consuming camera module has a difficulty in being applied with a VCM (Voice Coil Motor) technology used to be applied to the conventional camera module, and therefore, researches to solve the aforementioned disadvantage has been briskly waged.

A camera module mounted with miniaturized electronic parts such as smart phones may be frequently subjected to shocks in use, and may be subtly shaken by user handshake during photographing process. In consideration of this disadvantage, a camera module additionally mounted with a handshake compensation means has been recently developed.

An OIS (Optical Image Stabilization) module may be conventionally classified to a lens shift OIS module horizontally moving a lens in response to an object being moved to X axis and Y-axis, a sensor shift OIS module horizontally moving an image sensor, and a module tilt OIS module horizontally moving an AF (Auto Focus) module.

DISCLOSURE OF INVENTION

Technical Problem

Accordingly, it is an object of the present disclosure to provide a camera module having an OIS function.

Solution to Problem

In order to accomplish the above object, in one general aspect of an exemplary embodiment of the present disclosure there is provided a camera module, the camera module comprising: a PCB (Printed Circuit Board) mounted with an image sensor; a housing disposed at coupled to an upper surface of the PCB; a holder module spaced from a bottom surface of the housing at a predetermined distance, wound with a first coil at a periphery and including thereinside at least one or more lenses; a connecting portion disposed at coupled to an upper surface of the holder module and including a conductive pattern; a plate member coupled to a bottom surface of the holder module; and a plurality of wire springs connected at one end to the connecting portion and connected at the other distal end to the plate member.

Preferably, but not necessarily, the holder module may include an outer blade wound at a periphery with a first coil, and a bobbin disposed at a center of the outer blade, arranged with the lens and fixed at the periphery with a second coil.

Preferably, but not necessarily, the connecting portion may be formed with a conductive pattern formed at a surface of the housing.

Preferably, but not necessarily, the electronic circuit pattern layer may be formed on at least one of an exposed surface and an inner surface of the housing.

Preferably, but not necessarily, the electronic circuit pattern layer may include a metal layer formed by any one method of a coating method and a plating method using a conductive material.

Preferably, but not necessarily, the housing may include a first housing disposed at an upper surface of the PCB, a second housing disposed at an upper surface of the first housing, first and second permanent magnets interposed between the first and second housings, and a yoke arranged between the first and second permanents, or positioned at an inner lateral surface of the first and second housings to transmit a magnetic force into the holder module, wherein the upper surface of the first housing and a wall surface of one side of the first and second housings are covered by the electronic circuit pattern layer.

Preferably, but not necessarily, the yoke may be protrusively formed at a center portion towards the holder module.

Preferably, but not necessarily, the electronic circuit pattern layer may be integrally formed at surfaces of the first and second housings.

Preferably, but not necessarily, the housing may further include a shield can having a through hole at a position corresponding to a connection unit between the connecting portion and the wire springs and the lens module to encompass the connecting portion.

Preferably, but not necessarily, the holder module may include upper and bottom elastic members each disposed at an upper surface and a bottom surface of the bobbin to elastically support the bobbin relative to the outer blade, wherein the first coil is centrally formed with a space unit to allow a magnetic force to be magnetized toward the second coil.

Preferably, but not necessarily, the electronic circuit pattern layer may be integrally formed with a terminal unit at an area connected to the PCB.

Preferably, but not necessarily, the wire spring may be provided with a metal material conductively connected to the connecting portion and the plate member.

Preferably, but not necessarily, at least six (6) or more wire springs may be provided to supply two polarity power for auto focusing control and four polarity power for driving an OIS to the holder module via a connection with the connecting portion and the plate member.

Preferably, but not necessarily, a total of eight wire springs may be disposed at four corner areas of the holder module, two each at one corner area and each wire spring with a same length.

Advantageous Effects of Invention

Exemplary embodiments of the camera module according to the present disclosure have an advantageous effect in that connecting portion supplying a power to a wire spring can be replaced by a conductive pattern instead of the existing FPCB, whereby a highly reliable camera module having less susceptibility to short-circuit by an external shock can be provided.

Another advantageous effect is that the connecting portion can be integrally formed on an existing housing, although the connecting portion may be formed on a surface of a separate substrate, whereby a space for installing an FPCB can be reduced to enable a miniaturization of the camera module.

BEST MODE FOR CARRYING OUT THE INVENTION

Hereinafter, a camera module according to exemplary embodiments of the present disclosure will be described in detail with reference to the accompanying drawings.

Figure 1:
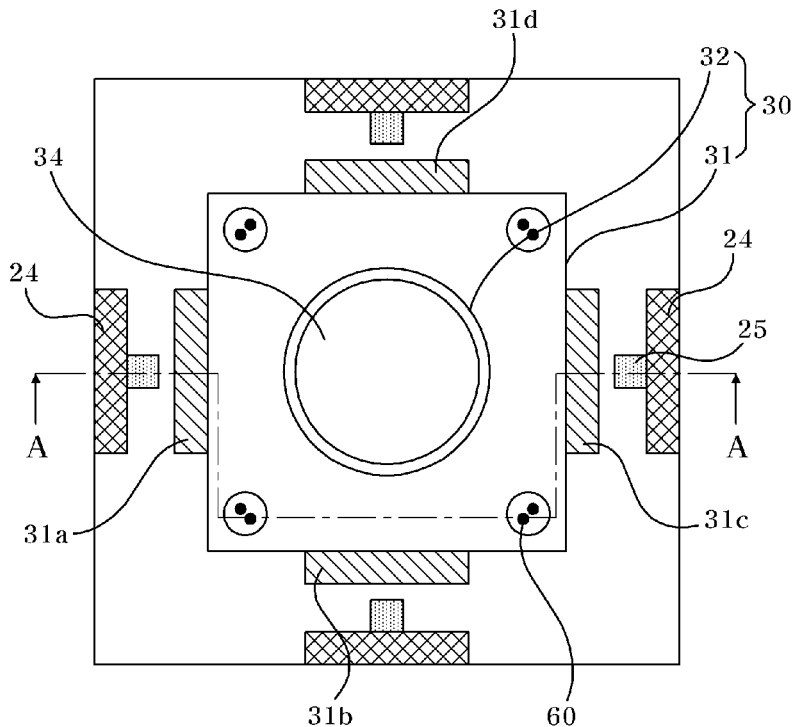
FIG. 1 is a schematic plan view illustrating a camera module according to an exemplary embodiment of the present disclosure.
Figure 2:
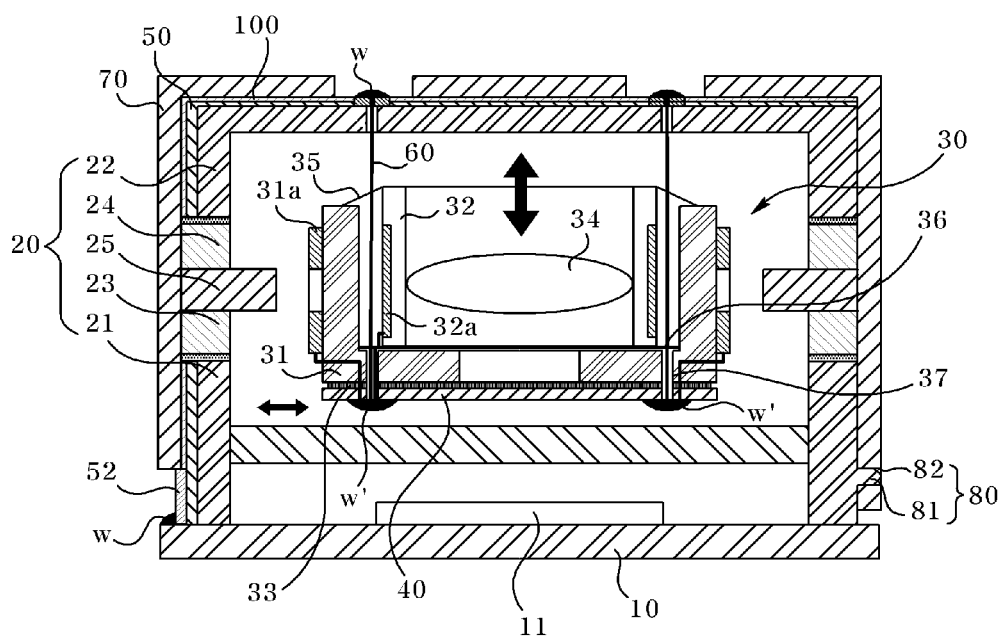
FIG. 2 is a cross-sectional view taken along line A-A of FIG. 1.
Figure 3:
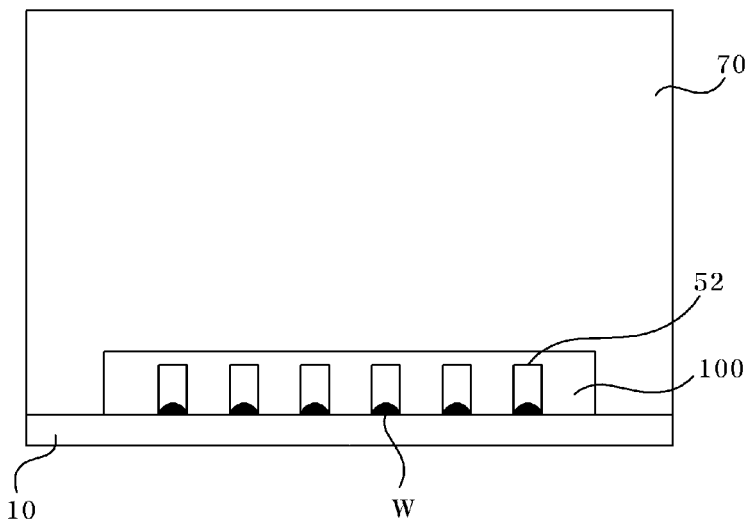
FIGS. 3 and 4 are respectively lateral views of a camera module according to an exemplary embodiment of the present disclosure.
Figure 4:
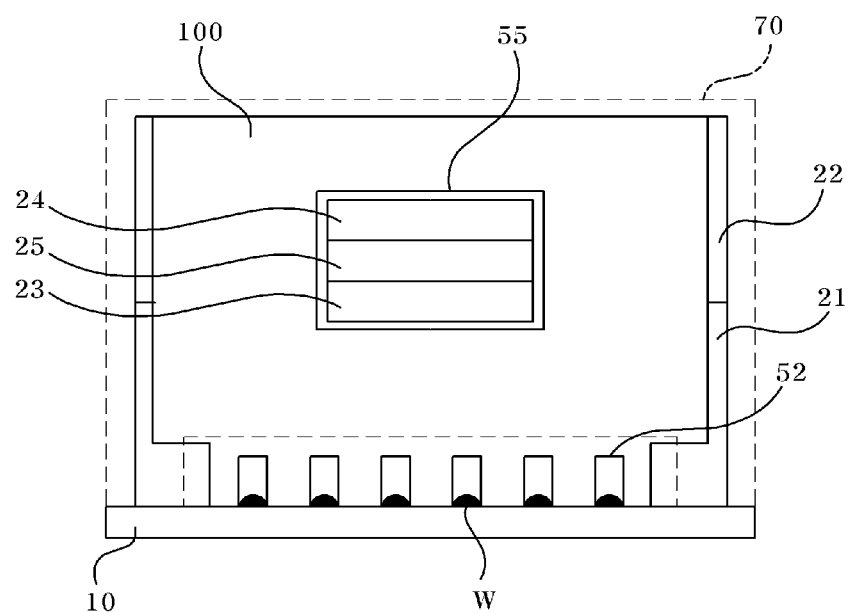
Figure 5:
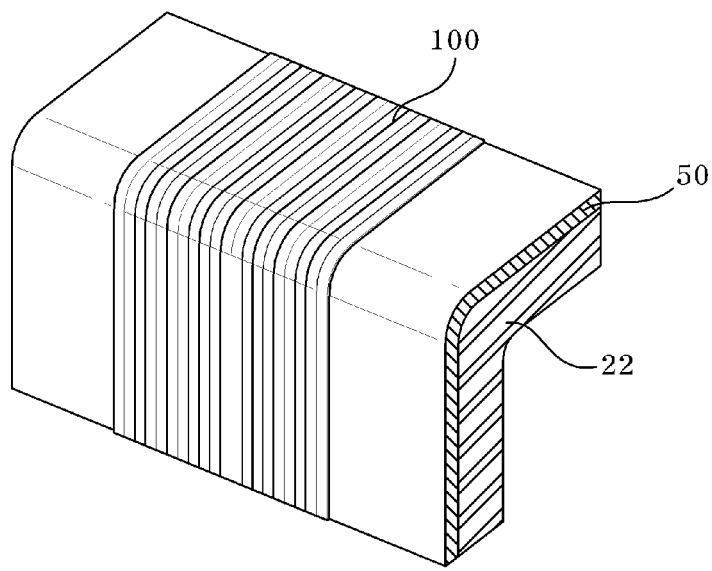
FIG. 5 is a schematic view illustrating a housing having a conductive pattern according to an exemplary embodiment of the present disclosure.
Figure 6:
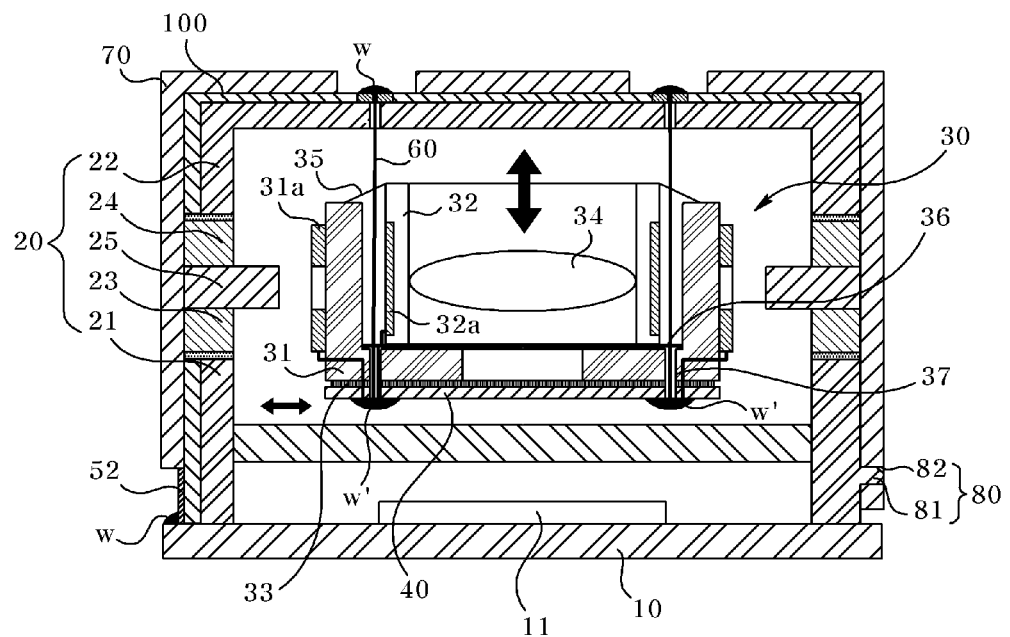
FIG. 6 is a schematic plan view illustrating a camera module having a conductive pattern according to another exemplary embodiment of the present disclosure.
Figure 7:
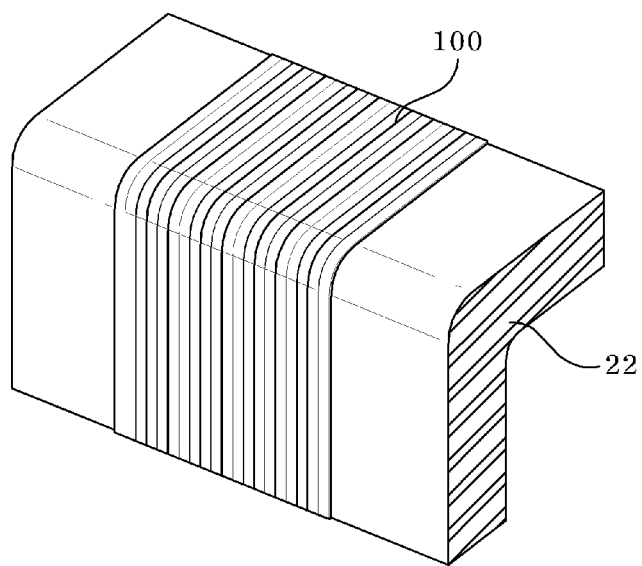
FIG. 7 is a schematic view illustrating a housing having a conductive pattern according to an exemplary embodiment of the present disclosure.

FIG. 1 is a schematic plan view illustrating a camera module according to an exemplary embodiment of the present disclosure, FIG. 2 is a cross-sectional view taken along line A-A of FIG. 1, FIGS. 3 and 4 are respectively lateral views of a camera module according to an exemplary embodiment of the present disclosure, FIG. 5 is a schematic view illustrating a housing having a conductive pattern according to an exemplary embodiment of the present disclosure, FIG. 6 is a schematic plan view illustrating a camera module having a conductive pattern according to another exemplary embodiment of the present disclosure, and FIG. 7 is a schematic view illustrating a housing having a conductive pattern according to an exemplary embodiment of the present disclosure.

Referring to the schematic plan view of FIG. 1, and FIG. 2 illustrating a schematic cross-sectional view taken along line A-A of FIG. 1, a camera module according to an exemplary embodiment of the present disclosure may include a PCB (Printed Circuit Board, 10), a housing (20), a holder module (30), a plate member (40), a connecting portion (50), a wire spring (60) and a conductive pattern (100).

The PCB (10) may be mounted at an approximate center with an image sensor (11). The PCB (10) may be arranged with constituent elements for operating the image sensor (11), or may be arranged with a plurality of terminal units capable of supplying power and outputting information of the image sensor (11). The housing (20) is disposed at an upper surface of the PCB (10) to form a frame of the camera module. According to an exemplary embodiment of the present disclosure, the housing (20) may include first and second housings (21, 22), first and second permanent magnets (23, 24), and a yoke (25).

The first housing (21), which is a base, is disposed at an upper surface of the PCB (10) and disposed at an area spaced apart from the image sensor (11) at a predetermined distance. The first housing (21) may be further installed with a filter member for filtering an image incident on the image sensor (11), if necessary. The second housing (22) is disposed at an upper surface of the first housing (21) to thereby cover the first housing (21). An opening is formed at an approximate center of the second housing (22) to allow an image to be transmitted to the image sensor (11). The second housing (22) may be disposed at an upper surface with a connecting portion (50, described later).

The first and second permanent magnets (23, 24) are interposed between the first and second housings (21, 22) to allow a magnetic force to be magnetized to the holder module (30). Each of the first and second permanent magnets (23, 24) may be provided with a same size. Furthermore, the first and second permanent magnets (23, 24) and the yoke (25) may be disposed at an inner lateral surface of the first and second housings within a design-allowable scope.

Meanwhile, in a case sizes of the first and second permanent magnets (23, 24) increase, an OIS driving is increased by a small current, and in a case the first and second permanent magnets (23, 24) are configured each with a predetermined size, the OIS driving is increased, as a current is increased that flows in first and second coils (31a, 32a) disposed at positions corresponding to those of the first and second permanent magnets (23, 24). In conclusion, as the sizes of the first and second permanent magnets (23, 24) increase, the OIS driving gets better to allow designing an optimal size within a design-allowable value.

The yoke (25) is interposed between the first and second permanent magnets (23, 24). Furthermore, the yoke (25) may be formed with a centrally protrusive shape to allow the magnetic force of the first and second permanent magnets (23, 24) to be magnetized to an inner space of the holder module (30). Preferably, the yoke (25) is provided with a width same as that of each of the first and second permanent magnets (23, 24), is centrally protruded at a predetermined size, whereby each of the permanents and the yoke are preferably formed with an approximate "T" shape.

The holder module (30) is discretely spaced from a bottom surface of the housing (20) at a predetermined distance, and includes an outer blade (31) and a bobbin (32). The holder module (30) can perform a pendulum movement to horizontal and diagonal directions while being suspended to the wire spring (60). Elastic members (35, 36) are provided at an upper surface and a bottom surface of the outer blade (31), and a vertical movement of the bobbin (32) may be elastically supported by the elastic member (35).

Referring to FIG. 1, the outer blade (31) is wound by a total of four (4) first coils (31a~31d) at four outer lateral surfaces, and a center of the four lateral surfaces wound by the first coils (31a~31d) is opened without coils. A position corresponding to the open space is arranged with the yoke (25), where the yoke (25) may be partially inserted into the open space.

The outer blade (31) may be fixed by the plate member (40) using a fixation member (33) such as double-sided tape or adhesive. The outer blade (31) is hung by a plurality of wire springs (60) and arranged on a bottom surface of the first housing (21) so as to horizontally or diagonally move (as shown by an arrow in FIG. 2) in response to magnetic force of the first and second permanent magnets (22, 23) and interaction of the first coils (31a~31d). Furthermore, the outer blade (31) may be provided with a plurality of spring through holes (37) passed through by the wire spring (60) to be connected to the plate member (40).

The bobbin (32) is disposed at an inner side of the outer blade (31) for vertical movement. The bobbin (32) is installed with at least one or more pieces of lenses (34). The bobbin (32) is wound at a periphery with the second coil (32a), where the second coil (32a) performs ascending and descending operations of the bobbin (32) in response to interaction with magnetic force magnetized through the open space with no first coils (31a~31d). Although an AF driving gets better as the size of the yoke (25) increases, but may be changed per an optimal design value. Thus, a focus of an image transmitted to the image sensor (11) can be automatically adjusted by the up-down operations of the bobbin (32).

The plate member (40) is preferably formed with a conductible metal material, and disposed at the bottom surface of the outer blade (31) as noted above, and connected to the wire spring (60) in order to supply a power to the first and second coils (31a, 32a), where any connection method may be allowable as long as they are connectible using a soldering or other conductive materials.

That is, a connection unit (w') of the plate member (40) may be connected to the first and second coils (31a, 32a) respectively to form an electromagnetic force by transmitting the power supplied through the wire spring (60) to the first and second coils (31a, 32a) as illustrated in FIG. 2.

At this time, the second coil (32a) may be directly connected to the plate member (40), or may be initially connected to a bottom spring (36) and the bottom spring (36) may be then connected to the plate member (40) as illustrated in FIG. 2.

The connecting portion (50) may be disposed at an upper surface of the second housing (22), where a power transmitted via a terminal unit (52) of the connecting portion (50) connected to the PCB (10) is transmitted to the plate member (40) via the wire spring (60) connected to the plate member (40), where any connection method may be allowable as long as they are connectible using a soldering or other conductive materials.

Referring to FIGS. 2, 3 and 4, the connecting portion (50) is arranged to cover a wall surface of one side of the first and second housings (21, 22), where a surface opposite to the first and second permanent magnets (23, 24) and the yoke (25) is formed with a window (65) to avoid interference therewith. This is an avoidance configuration, because it is general that the first and second permanent magnets (23, 24) and the yoke (25) are directly attached to the shield can (70, described later) using fixing means such as epoxy and the like.

According to an exemplary embodiment of the present disclosure, as illustrated in FIGS. 2~5, the connecting portion (50) may form a wiring on a surface by using a technique forming a conductive pattern (100). The technique may be largely categorized into three types.

A first method is an electroplating method using a dual forming, where a body part forming the connecting portion (50) and a part forming an externally exposed lateral wall surface provided with the electronic circuit pattern layer (100) are injection molded using mutually different synthetic resins. That is, the connecting portion (50) is injection-molded in such a manner that a body unit of the base (20) is injection-molded using an insulation material, while the lateral wall part for forming the electronic circuit pattern layer (100) is injection molded with a conductible synthetic resin, or with a metal plating-easy synthetic resin, and the electronic circuit pattern layer (100) is completed by using a post processing such as electroplating.

The second method is such that the connecting portion (50) is injection molded with impurities reactive to heat and light included, and an exposed lateral wall surface to be formed with the electronic circuit pattern layer (100) is laser-exposed via a surface patterning process to the injection-molded connecting portion (50) such as laser lithography to form the electronic circuit pattern layer (100) thereon.

Meanwhile, the third method is a method in which an entire surface is metalized, where an entire surface of the connecting portion (50) is metalized to form the electronic circuit pattern layer (100) on the exposed surface.

Meanwhile, a surface of the electronic circuit pattern layer (100) formed by the above-mentioned first, second and third methods may be further formed with a metal layer formed by any one of coating or electroplating methods using a conductible material.

According to another exemplary embodiment of the present disclosure, as illustrated in FIGS. 6 and 7, it is possible to directly configure the electronic circuit pattern layer (100) on surfaces of the first and second housings (21, 22) instead of the connecting portion (50). In this case, the electronic circuit pattern layer (100) may replace the function of the connecting portion (50), whereby the electronic circuit pattern layer (100) can be directly formed on the surfaces of the first and second housings (21, 22) to allow the wire spring (60) to be supplied with the power and to prevent the connecting portion (50) from being short-circuited by an external shock.

In a case the wiring is formed using the electronic circuit pattern layer (100), the terminal unit (52) illustrated in FIGS. 2 and 6 may be also integrally formed with the electronic circuit pattern layer (100), and a terminal module of a separate metal material may be also attached thereto.

The configuration thus described can minimize an occurrence of short-circuit caused by an external shock and to dispense with a separate space for providing the connecting portion (50) using FPCB to the advantage of minimizing the camera module.

The wire spring (60) is connected at both distal ends to the plate member (40) and the connecting portion (50). At this time, one end of the wire spring (60) is connected to the connecting portion (50) as illustrated in FIG. 2, where the wire spring (60) connected to the connecting portion (50) supplies the power inputted through the terminal unit (52) to the plate member (40) side to allow the first and second coils (31a, 32a) to interact with the first and second permanent magnets (23, 24).

Furthermore, the other distal end of the wire spring (60) passes a spring through hole (37) formed at the outer blade (31) to be connected to the plate member (40) installed at a bottom surface of the outer blade (31), as shown in FIG. 2.

At this time, the other distal end of the wire spring (60), albeit not being illustrated, is connected to a pad (not shown) formed at the plate member (40) along with the connecting portion (50), where the pad (not shown) is centrally formed with a through hole (not shown) passed by the wire spring (60), where any connection method may be allowable as long as they are connectible using a soldering or other conductive materials.

According to the configuration thus described, the outer blade (31) may be hung onto the wire spring (60) to be discretely spaced from the bottom surface of the first housing (21) at a predetermined distance. Then, the outer blade (31) can perform the pendulum movement in response to the interaction between the first coil (31a) and the first and second permanent magnets (23, 24) to compensate the vibration of the outer blade (31) caused by handshake, using the interaction between the first coil (31a) and the first and second permanent magnets (23, 24). To this end, the wire spring (60) is preferably provided with a conductible elastic metal material capable of withstanding a shock.

Meanwhile, the thinner thickness of the wire spring (60) has a better handshake compensation capability even to a small current, but the thickness may be changed according to an optimal design value. Preferably, the thickness of the wire spring (60) is several μm to several hundred μm, and more preferably 1 μm to 100 μm.

Furthermore, there is a need that at least six or more wire springs (60) are provided to supply two polarity powers for auto focusing control and four polarity powers for driving an OIS to the holder module (30) via a connection with the plate member (40) and the connecting portion (50).

Referring to FIGS. 1 and 2, according to the exemplary embodiment of the present disclosure, a total of eight wire springs are preferably disposed at four corner areas of the holder module (30), two wire springs, each at one corner area, and each wire spring with a same length, for maintaining a balance.

Meanwhile, as illustrated in FIG. 2, in a case a separate third housing such as a shield can (70) is further included, the connecting portion (50) covers a lateral wall surface of the first and second housings (21, 22) by forming a window in order to avoid a coupled portion, because the first and second permanent magnets (23, 24) and the yoke (25) are fixedly coupled to the shield can (7) using an epoxy and the like.

The shield can (70) may be formed with a through hole at a position corresponding to that of the holder module (30) about a connection unit (w) between the connecting portion (50) and the wire spring (60) to encompass the housings (21, 22).

Meanwhile, as illustrated in FIG. 2, a hook unit (80) may be formed on four (4) surfaces or at least one or more surfaces of the shield can (70) in order to fix the shield can (70) to the first housing (21), where a position thereof may be a center or a marginal area within an allowable design scope, and the hook units (80) may be provided in a single number or a plural number. The hook unit (80) may include a hook (81) protrusively formed at the first housing (21), and a hook hole (82) thoroughly formed at the shield can (70), which is opposite to the hook (81). If necessary, the hook unit (80) may be configured in the other way.

The previous illustrative description of the present disclosure is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The exemplary embodiments of the present disclosure are applicable to a small-sized camera module used for small-sized portable electronic devices such as mobile terminals and tablet PCs.

The invention claimed is:

1. A camera module, the camera module comprising:
a PCB (Printed Circuit Board) mounted with an image sensor; a housing disposed at coupled to an upper surface of the PCB;
a holder module spaced from a bottom surface of the housing at a predetermined distance, wound with a first coil at a periphery and including thereinside at least one or more lenses;
a connecting portion disposed at an upper surface of the holder module and including a conductive pattern;
a plate member coupled to a bottom surface of the holder module; and
a plurality of wire springs connected at one end to the connecting portion and connected at the other end to the plate member;
a bobbin disposed at a center of an outer blade;
wherein at least six or more wire springs are provided to supply two polarity power for auto focusing control and four polarity power for driving an OIS (Optical Image Stabilization) via a connection with the plate member and the connecting portion;
wherein a total of eight wire springs are disposed at four corner areas of the holder module, two each at one corner area and each wire spring with a same length.

2. The camera module of claim 1, wherein the holder module includes the outer blade wound at a periphery with a first coil, and the bobbin arranged with the lens and fixed at the periphery with a second coil.

3. The camera module of claim 2, wherein the holder module includes upper and lower elastic members each disposed at an upper surface and a lower surface of the bobbin to elastically support the bobbin relative to the outer blade, wherein the first coil is centrally formed with a space unit to allow a magnetic force to be magnetized toward the second coil.

4. The camera module of claim 1, wherein the connecting portion is formed with a conductive pattern formed at a surface of the housing.

5. The camera module of claim 1, wherein the conductive pattern is formed on at least one of an exposed surface and an inner surface of the housing.

6. The camera module of claim 5, wherein the conductive pattern includes a metal layer formed by any one method of a coating method and a plating method using a conductive material.

7. The camera module of claim 1, wherein the housing includes a first housing disposed at an upper surface of the PCB, a second housing disposed at an upper surface of the first housing, first and second permanent magnets interposed between the first and second housings, and a yoke arranged between the first and second permanents, or positioned at an inner lateral surface of the first and second housings to transmit a magnetic force into the holder module, wherein the upper surface of the first housing and a wall surface of one side of the first and second housings are covered by the electronic circuit pattern layer.

8. The camera module of claim 7, wherein the yoke is protrusively formed at a center portion towards the holder module.

9. The camera module of claim 7, wherein the conductive pattern is integrally formed at surfaces of the first and second housings.

10. The camera module of claim 7, wherein the housing further includes a shield can having a through hole at a position corresponding to the connecting portion between connecting portion the wire springs and the holder module to encompass the housing connecting portion.

11. The camera module of claim 1, wherein the conductive pattern is integrally formed with a terminal unit at an area connected to the PCB.

12. The camera module of claim 1, wherein the wire spring is provided with a metal material conductively connected to connecting portion the connecting portion and the plate member.

* * * * *